Nov. 19, 1968     R. G. DRAGAR     3,411,335
THRUST BEARING ASSEMBLY
Filed Feb. 16, 1966     3 Sheets-Sheet 1
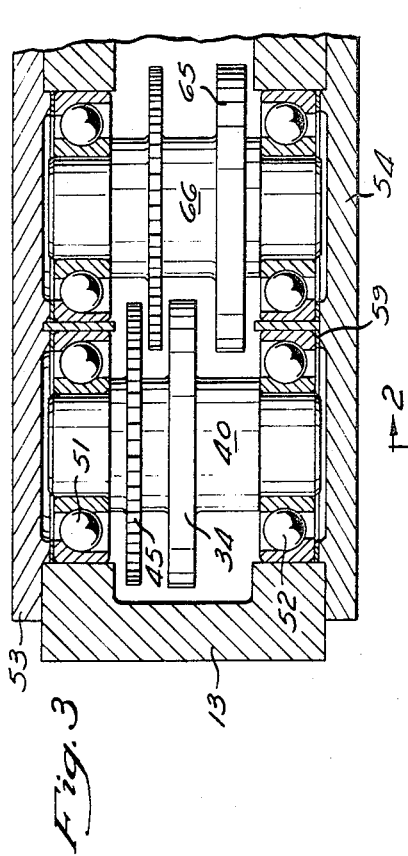
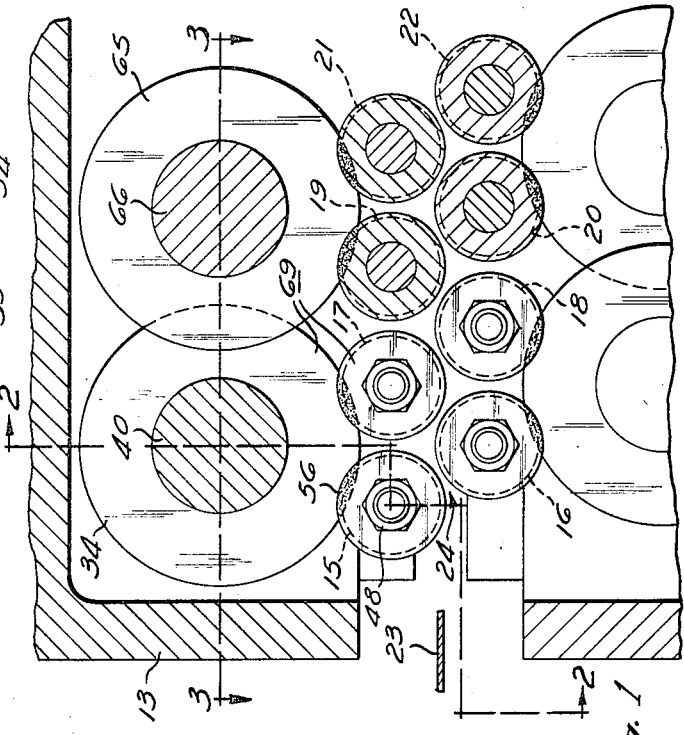
INVENTOR.
RUDOLPH G. DRAGAR
BY Woodling, Krost,
George and Rust
ATTORNEYS

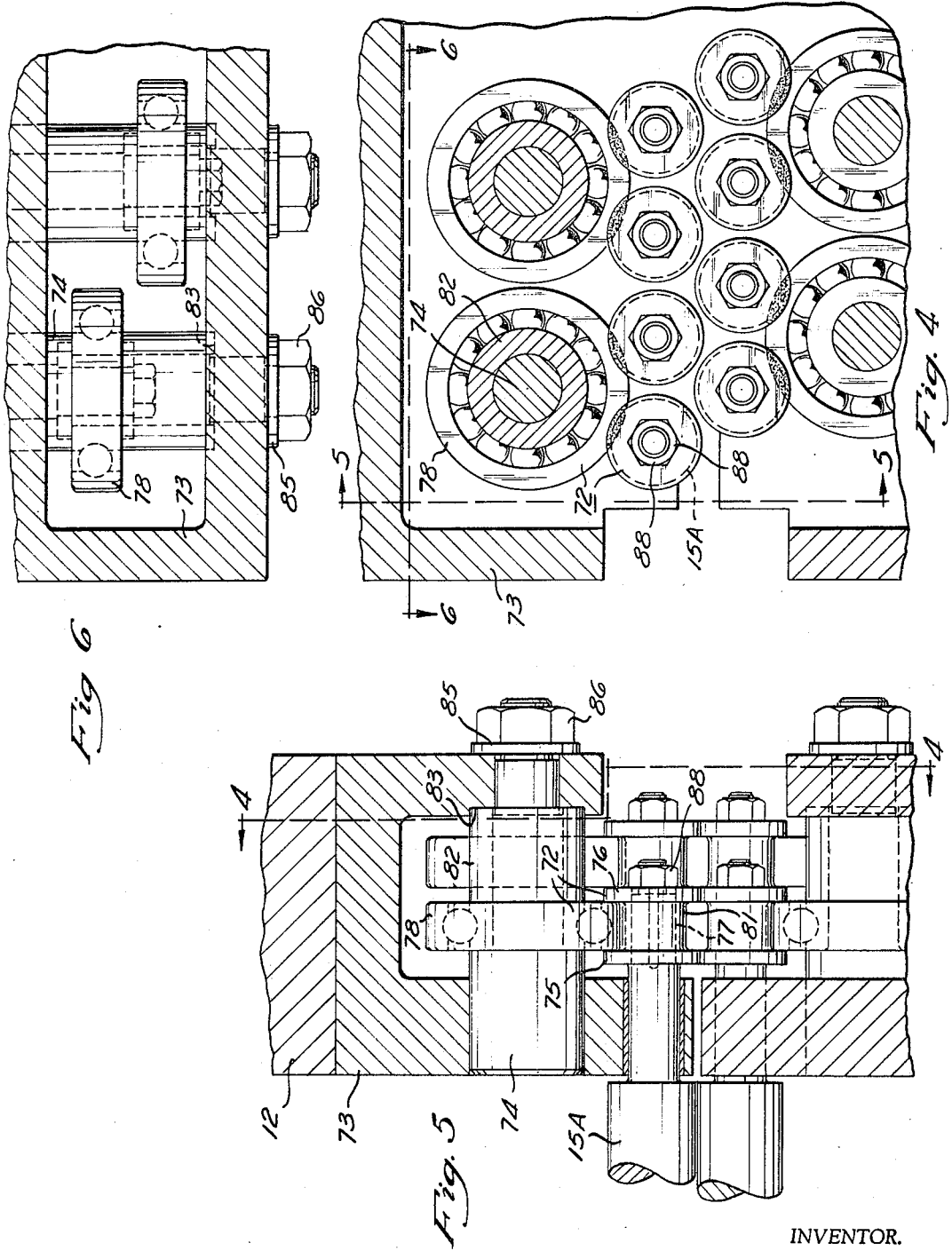

Nov. 19, 1968  R. G. DRAGAR  3,411,335

THRUST BEARING ASSEMBLY

Filed Feb. 16, 1966  3 Sheets-Sheet 3

INVENTOR.
RUDOLPH G. DRAGAR
BY Woodling, Krost,
Granger and Rust
ATTORNEYS

United States Patent Office 3,411,335
Patented Nov. 19, 1968

3,411,335
THRUST BEARING ASSEMBLY
Rudolf G. Dragar, Pittsburgh, Pa., assignor to Lee Wilson Engineering Company, a corporation of Ohio
Filed Feb. 16, 1966, Ser. No. 527,793
17 Claims. (Cl. 72—237)

ABSTRACT OF THE DISCLOSURE

Thrust bearing assemblies for use on machines with restricted space for a thrust bearing, which have many small diameter closely spaced work rolls to flex and work the metal and which develop high longitudinal thrust loads on the work rolls. The thrust bearing assembly transfers those thrust loads in a direction transversely of the work rolls to a location where there is a larger space for a larger capacity rollable element thrust bearing. A first thrust member is mounted on the work roll and a second thrust member is mounted on an arbor spaced from the axis of the work roll. These two thrust members overlap to transmit the thrust through a thrust contact area.

---

The invention relates in general to thrust bearing assemblies and more particularly to a means to increase the thrust load capacity of a bearing assembly for a rotatable shaft.

In many types of industrial units there is a limited space for mounting a thrust bearing. Examples of such industrial units include strip and plate leveling machines, rolling mills, etc., wherein minimum diameter work rolls and close centers of the work rolls result in a more uniform and satisfactory product. However, this also increases the power requirements and aggravates the thrust loads. The small diameter work rolls with their close spacing of centers preclude the possibility of mounting an adequate size of anti-friction thrust bearing directly on the necks of the work rolls to withstand the high thrust loads. As a result, the industry has relied on thrust rings or thrust collars which are plain bearings rather than rollable element bearings such as ball or roller bearings to withstand these forces. High friction forces plus high rubbing velocities and a minimum area for absorbing these forces have caused rapid deterioration and required frequent replacement of these thrust rings. This has resulted in high operating costs due to shut-downs of the industrial units involved.

Accordingly an object of the invention is to obviate the above mentioned disadvantages.

Another object of the invention is to provide a thrust bearing assembly of greater capacity than normally could be accommodated within the diameter of the work roll or rotatable shaft involved.

Another object of the invention is to transfer the thrust load off the axis of the work roll having the thrust load to an adjacent area whereat a larger space is available for absorbing the thrust load.

Another object of the invention is to provide a thrust bearing design wherein a plurality of thrust members may be provided to share the thrust load.

Another object of the invention is to provide a plurality of interleaved discs or annular thrust members with some of the plurality on the work roll having the thrust load and others of the plurality on an adjacent support or arbor.

Another object of the invention is to provide a positive means of locating the work roll in an axial position and maintaining this position.

Another object of the invention is to provide two thrust bearing assemblies with thrust members on two different work rolls so that the thrust on each work roll is transmitted to a common support or arbor to aid in cancelling opposing thrust loads on the two work rolls.

Another object of the invention is to provide a positive means to drive the adjacent arbor which absorbs the thrust in order to prevent scuffing or distortion between the thrust discs or members.

The invention may broadly be incorporated in a thrust bearing assembly for a first work roll journalled in frame means, comprising, in combination, first and second thrust members, means to mount said first thrust member on an end of the first work roll, an arbor, means to mount said arbor on the frame means along an axis displaced from the axis of the first work roll, means mounting said second thrust member on said arbor, the diameter of said thrust members and the spacing therebetween establishing overlapping of said thrust members in an area bounded by an arc of at least one of said first and second thrust members, a thrust contact area being established between said first and second thrust members within said arcuate boundaries, said thrust contact area being in a plane having a major component perpendicular to the axis of the first work roll, and a rollable element thrust bearing acting between said second thrust member and the frame means to permit relative rotation between the work roll and the frame means with rolling contact at said thrust contact area rather than sliding contact between said first and second thrust members.

Other objects and a fuller understanding of the invention may be had by referring to the following description and claims, taken in conjunction with the accompanying drawings, in which:

FIGURE 1 is a sectional view taken on line 1—1 of FIGURE 2, through a roll stand incorporating the invention;

FIGURE 2 is a sectional elevational view on line 2—2 of FIGURE 1;

FIGURE 3 is a sectional elevational view on line 3—3 of FIGURE 1;

Figure 7:
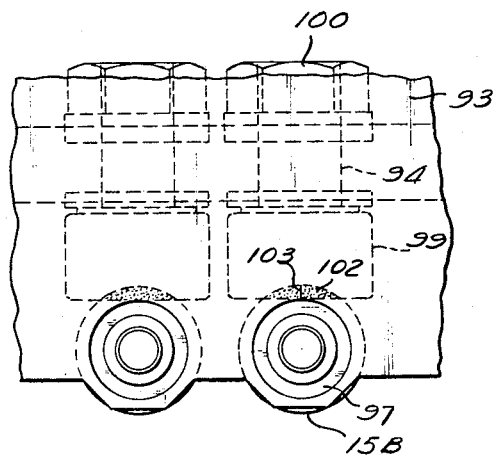
Figure 8:
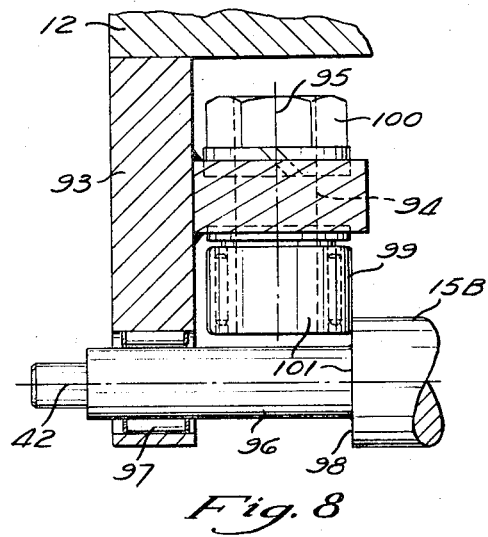
Figure 9:
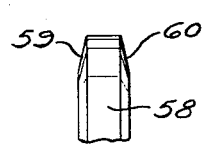
Figure 10:
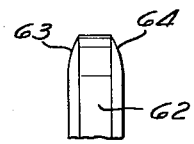

FIGURES 4, 5, and 6 are views similar to FIGURES 1, 2, and 3 but showing a modification;

FIGURES 7 and 8 are views similar to FIGURES 1 and 2 but showing an alternative modification; and, FIGURES 9 and 10 are modifications of the thrust members.

The invention may be incorporated in many types of industrial units incorporating a rotatable shaft subject to a thrust load. As an example of such an industrial unit the drawing illustrates a roll stand 11 having frame means 12. First and second housings 13 and 14 are attached to this frame means 12. This roll stand 11 may be one designed for strip or plate leveling machines, rolling mills, etc., wherein small diameter work rolls 15, 16, 17, 18, 19, 20, 21, and 22 are mounted on closely spaced centers. The work rolls 15, 17, 19, and 21 may be termed upper work rolls and the work rolls 16, 18, 20, and 22 may be termed lower work rolls. The section of FIGURE 2 shows only work rolls 15 and 16 and FIGURE 1 shows that this combination of work rolls 15–22 are closely spaced and provide a tortuous path for passage of sheet or strip material 23 into the pass 24 between the upper and lower work rolls. These work rolls, in a leveler, flex the strip material 23 in order to exceed its yield strength. Small diameter closely spaced rolls are used so that the yield strength is reached or exceeded to a significant depth in the material. In this condition, material can be successfully elongated and therefore, leveled as it passes through such a machine. This establishes very high forces transverse to the axes of these work rolls. Accordingly, the neck 25 of each work roll 15, as shown in FIGURE 2 must be of fairly large diameter. This neck 25 is journalled in a plain or antifriction radial bearing 26 in the housing 13. Additionally to withstand the high transverse forces on the rolls 15–22 the usual backup rolls may be employed, as in a four-high rolling mill, although these backup rolls are not illustrated.

High thrust loads are developed on the work rolls 15–22. These thrust loads are developed because the axis of the work roll and the axis of the backup roll are not perfectly parallel. Also the nature of the interaction between the strip 23 and work rolls 15–22 develops an axial end thrust. Additionally the work pressure from the strip 23 to the work rolls 15–22 is not perfectly centered longitudinally of the work rolls. Also the camber in the strip gives some end thrust. This all adds to a considerable end thrust which varies momentarily as the strip 23 goes through the pass 24 between the work rolls.

The present invention contemplates a thrust bearing assembly 29 to absorb these large and variable thrust loads. In the prior art construction it was usual to use a plain bearing thrust ring or thrust collar in the space 30 between the end of the work roll 15, at the shoulder forming the neck 25, and the housing 13 of the frame. The present design of thrust bearing assembly 29 includes a neck 31 outboard of the bearing 26 journalling the work roll 15. FIGURE 2 illustrates one such thrust bearing assembly 29 and such assembly may be duplicated for each of the work rolls 16–22. First and second thrust members 33 and 34 are provided. The first thrust member 33 is a disc which may be integral with, or fixed to the neck 31 of the work roll 15. A key 39 is provided to fix the thrust member 33 to the neck 31. Additional interleaved thrust members may be provided to share the load, and a thrust member 35 is shown on the work roll 15. The thrust member 34 may be integral with or fixed to a support or arbor 40. This arbor has an axis 41 which is preferably parallel to the axis 42 of the work roll 15. Alternatively this arbor axis 41 may be at a small angle to the axis 42 so that the axis 41 has a major component parallel to the axis 42 of the work roll 15.

A gear 44 is fixed on the work roll 15, in this case by the key 39, and a gear 45 is fixed on the arbor 40. A spacer 47 is provided on the work roll 15 between thrust members 33 and 35. A nut 48 holds the thrust discs 33 and 35 and spacer 47 in place on roll neck 31.

The arbor 40 is journalled for rotation about the axis 41 in the housing 13 by being mounted in combined radial and thrust bearings 51 and 52. Bearing retainer caps 53 and 54 are adjustable by shims 55 to adjust the longitudinal position of the arbor 40 relative to the housing 13.

The thrust members 33–35 have combined radii or transverse dimensions greater than the spacing between the axes 41 and 42. This establishes overlapping of the thrust members in an area 56 shown in FIGURE 1. This may be called a thrust area and is bounded by an arc on each of the thrust members 33 and 34. If a plurality of thrust members are interleaved with the proper width of spacer therebetween, this will assure that each of these thrust members shares the thrust load and thus there will be a plurality of thrust areas 56 between the interleaved thrust members 33–35. The intermeshing gears 44 and 45 have the proper pitch diameter to assure proper peripheral speeds of the thrust members 33 and 34, for example, to achieve principally a rolling contact at the thrust areas 56. This rolling contact minimizes the friction in the entire thrust bearing assembly 29 and essentially eliminates sliding friction. The thrust loads are thereby transmitted from the work roll 15 to the arbor 40 and through the bearings 51 and 52 to the housing 13 and hence to the frame 12.

FIGURES 9 and 10 show alternate shapes to the thrust members. FIGURE 9 shows a thrust member 58 having conical edge surfaces 59 and 60. With complementary thrust members 58 on the work roll 15 and the arbor 40 this would result in substantially a line contact and a thrust contact area within the confines of the thrust area 56. FIGURE 10 shows another alternative thrust member 62 having arcuate or curved contact surfaces 63 and 64 on the opposite faces thereof and use of complementary thrust members 62 on the work roll 15 and arbor 40 will result in a small thrust contact area between these two thrust members within the thrust area 56. Use of these two alternative thrust members 58 or 62 will result in an even greater reduction of friction in the thrust bearing assembly 29. The thrust contact area of the thrust members 58 and 62 in FIGURES 9 and 10 is in a plane having a major component perpendicular to the axis of the work roll 15.

FIGURE 1 illustrates that there is one arbor 40 for each of the two adjacent work rolls 15 and 17. Thus one set of thrust members 33 and 35 on the work roll 15 are interleaved or paired with the thrust member 34 on the arbor 40. Additionally this same thrust member 34 on the arbor 40 is a part of a second thrust bearing assembly 69 acting between arbor 40 and the work roll 17 in a manner similar to that of bearing assembly 29 acting between arbor 40 and work roll 15. Similarly the next adjacent pair of work rolls 19 and 21 in the upper work roll sets, have thrust bearing assemblies to a thrust member 65 on a single arbor 66 adjacent to such pair. All of the pairs of work rolls are similarly provided with thrust bearing assemblies. This has a very beneficial effect because it has been found that the instantaneous end thrust on a particular work roll may be of a substantially different value or even be in the opposite direction relative to the end thrust on the adjacent work roll. Where these work rolls are paired and transmit the thrust thereof to a common adjacent arbor 40, then such thrusts tend to cancel out directly in the arbor 40 without being transmitted through the bearings 51 and 52 to the housing 13. It will be noted in FIGURE 1 that the arbor 40 may be approximately twice the diameter of the work roll 15 and accordingly the bearings 51 and 52 may be approximately twice the diameter or even larger than they could be if they were mounted in the space 30 at the end of the work roll 15. This means that the thrust on the work roll 15 is transferred to an adjacent space whereat there is adequate area and volume to mount properly sized thrust bearings to support the thrust load. Also additional thrust members 33–35 may be interleaved on arbor 40 to permit a further increase in thrust capacity of the assembly 29 because the thrust is shared by these several thrust members. Still further the thrust bearing assembly 29, because the bearing caps 53 and 54 are adjustable, permits a positive axial locating of the individual work rolls 15–20.

The thrust discs 34 and 65 are bypassed, that is, not in the same plane, and this permits use of large diameter discs.

FIGURES 4, 5, and 6 show an alternative construction of a thrust bearing assembly 72. The frame 12 carries a housing 73 similar to housing 13. This housing 73 carries a stationary arbor 74. Thrust members shown as discs 75 and 76 are fixed on the outboard neck 77 of the work roll 15A. These thrust members 75 and 76 are interleaved with a thrust member 78 on the stationary arbor 74. The thrust members 75 and 76 are thrust discs separated by a spacer 81 substantially the same width as the thrust member 78. Thrust member 78 is a thrust bearing 78. A spacer 82 spaces bearing 78 from an end wall 83 of the housing 73. A washer 85 and lock nut 86 are used to fasten the thrust member 78 in place on the arbor 74. A lock nut 88 is used to fix the thrust member 75 in place on the neck 77 of the work roll 15A.

Again in FIGURES 4, 5, and 6 the thrust bearing assembly 72 transmits the thrust from a small diameter work roll 15A to a larger diameter arbor 74 whereat the thrust bearing 78 is of large diameter to carry this thrust load.

FIGURES 7 and 8 show a further modification. A housing 93 may again be fixed to the frame 12. This housing carries a stationary arbor 94 having an axis 95 perpendicular to the axis 42 of the work roll 15B. This work roll is again provided with a neck 96 journalled in a plain or antifriction bearing 97 in the housing 93. A right angle shoulder 98 on the work roll 15B acts against a cam type bearing 99 journalled on the stationary arbor 94. This cam type bearing 99 may be a ball or roller bearing, for example, to have low friction and a large capacity in a radial direction relative to axis 95 to absorb the thrust from the work roll 15B. This bearing 99 may have a diameter equal to the spacing between adjacent work rolls, less a slight clearance between the bearings. The arbor 94 is held in place by a nut 100 and such cam type bearing forms a thrust bearing assembly 101 together with the shoulder 98 on the work roll 15B. The thrust bearing assembly 101 may be duplicated at the other end of the roll stand in order to provide an absorption of thrust in both axial directions. FIGURE 7 shows a thrust area 102 bounded by an arc of the shoulder 98 between the bearing 99 and this shoulder 98. In this construction the actual thrust contact area will be generally a line contact 103 lying within this thrust area.

The thrust bearing assemblies 29, 69, 72 and 101 of the invention thus provide a means to transmit a force through a system of thrust members to an adjacent space of sufficient area and volume to carry the thrust loads involved. Further the gears 44 and 45 provide a positive drive of the arbor 40 so as to rotate all of the thrust members 33–35 to achieve rolling contact rather than sliding friction.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thrust bearing assembly for a first work roll journalled in frame means, comprising, in combination:
   first and second thrust members each having a diameter,
   means to mount said first thrust member on an end of the first work roll,
   an arbor,
   means to mount said arbor on the frame means along an axis displaced from the axis of the first work roll,
   means mounting said second thrust member on said arbor in a position spaced from the axis of said work roll,
   the diameter of said thrust members and the spacing therebetween establishing overlapping of said thrust members in a thrust area bounded by an arc of at least one of said first and second thrust members,
   a thrust contact area being established between said first and second thrust members within said thrust area,
   said thrust contact area being in a plane having a major component perpendicular to the axis of the first work roll,
   and a rollable element thrust bearing acting between said second thrust member and the frame means to establish principally rolling contact at said thrust contact area upon rotation of said work roll.

2. A thrust bearing assembly as defined in claim 1 including a second work roll closely spaced to the first work roll,
   and said thrust bearing having a diameter larger than the first work roll to have a rated thrust capacity greater than a thrust bearing mounted on the first work roll would have.

3. A thrust bearing assembly as defined in claim 1 wherein said arbor is circular and said second thrust member is annular and encircles said arbor.

4. A thrust bearing assembly as defined in claim 1 wherein the plane of said thrust contact area is perpendicular to the axis of the work roll,
   and said thrust contact area is substantially coextensive with the area bounded by said overlapping arcs.

5. A thrust bearing assembly as defined in claim 1 wherein each of said first and second thrust members is annular.

6. A thrust bearing assembly as defined in claim 5 wherein said thrust contact area is bounded by an arc on said first thrust member and a larger radius arc on said second thrust member,
   and said first thrust member being fixed on said first work roll.

7. A thrust bearing assembly as defined in claim 1 including a second work roll,
   a second thrust bearing assembly acting between said second work roll and said arbor and including a thrust member on said second work roll,
   said second thrust member on said arbor cooperating with the thrust members on both the first and second work rolls,
   and said second thrust member being in the order of twice the diameter of said first thrust member.

8. A thrust bearing assembly as defined in claim 1 including a plurality of first thrust members on the work roll with two of the plurality being disposed on opposite sides of said second thrust member to resist axial thrust in each axial direction.

9. A thrust bearing assembly as defined in claim 1 including the axis of said arbor being disposed substantially parallel to the axis of the work roll.

10. A thrust bearing assembly as defined in claim 1 wherein the axis of said arbor has a major component parallel to the axis of the first work roll.

11. A thrust bearing assembly as defined in claim 1 including said rollable element thrust bearing being mounted between the frame means and said arbor to permit rotation of said arbor.

12. A thrust bearing assembly as defined in claim 1 including said rollable element thrust bearing being mounted between said arbor and said second thrust member,
    and said arbor being stationary.

13. A thrust bearing assembly as defined in claim 1 wherein the axis of said arbor is substantially perpendicular to the axis of the first work roll.

14. A thrust bearing assembly as defined in claim 1 wherein the plane of said thrust contact area is disposed at a small acute angle relative to a plane perpendicular to the axis of the work roll.

15. A thrust bearing assembly for a roll stand having first and second cooperating work rolls each having first and second ends journalled in first and second frame members, respectively, in small diameter bearings,
    the work rolls rolling on strip material passing therebetween and the interaction between the work rolls and the strip material exerting an axial end thrust on the work rolls,
    said thrust bearing assembly, comprising, in combination,
    a neck outboard of the bearing on the first work roll,
    a pair of first thrust discs fixed on said neck,
    a spacer between said pair of thrust discs,
    a thrust arbor mounted in the first frame member on an axis parallel to and spaced from the axis of the first work roll,
    a second disc on said thrust arbor,
    said spacer on the first work roll being substantially the same thickness as said second thrust disc on said thrust arbor,
    said discs being larger in diameter than said spacer in order to have a thrust contact area of arcuate portions overlapping and interengaging between said first thrust discs on the first work roll and said second thrust disc on said thrust arbor, and a combined thrust and radial bearing acting between said second disc and the first frame member, so as to provide anti-friction engagement between the arcuate portions of said thrust discs to transmit axial thrust on the first work roll to said thrust arbor whereat the space available for thrust bearings is considerably larger than at the journalled portion of the first work roll.

16. A thrust bearing assembly as defined in claim 15, including a gear fixed on the first work roll, a gear on said thrust arbor fixed thereto and meshing with the gear on the first work roll for rotation of said thrust arbor in unison with the work roll.

and said radial and thrust bearing jouralling said thrust arbor on the first frame member.

17. A thrust bearing assembly as defined in claim 15, wherein said combined thrust and radial bearing is mounted on said thrust arbor with a portion of said thrust and radial bearing acting as said second thrust disc.

References Cited

UNITED STATES PATENTS

| | | | |
|---|---|---|---|
| 1,922,380 | 8/1933 | Lucas | 72—237 |
| 3,003,836 | 10/1961 | Hill | 72—237 |

CHARLES W. LANHAM, *Primary Examiner.*

A. RUDERMAN, *Assistant Examiner.*